United States Patent

McLoughlin et al.

(10) Patent No.: US 6,537,695 B2
(45) Date of Patent: ***Mar. 25, 2003

(54) NON-WOVEN FABRIC TREATMENT

(75) Inventors: Robert Hamilton McLoughlin, Wiltshire (GB); Giovanni Gentilcore, Wiltshire (GB); John Anthony Cook, Oxfordshire (GB)

(73) Assignee: Scimat Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,055
(22) PCT Filed: Jun. 8, 1998
(86) PCT No.: PCT/GB98/01672
§ 371 (c)(1), (2), (4) Date: Feb. 16, 2000
(87) PCT Pub. No.: WO98/58108
PCT Pub. Date: Dec. 23, 1998

(65) Prior Publication Data
US 2003/0017400 A1 Jan. 23, 2003

(30) Foreign Application Priority Data
Jun. 18, 1997 (GB) ............................................. 9712690

(51) Int. Cl.$^7$ ................................................. H01M 6/00
(52) U.S. Cl. ....................... 429/122; 429/247; 429/248; 429/249; 429/250; 429/254
(58) Field of Search ................................. 429/247, 248, 429/249, 250, 254, 122

(56) References Cited

U.S. PATENT DOCUMENTS 5,798,189 A * 8/1998 Hayashida et al. ......... 429/101
5,922,417 A * 7/1999 Singleton et al. ........... 427/558

FOREIGN PATENT DOCUMENTS

| EP | 0 221 645 | 5/1987 |
| EP | 0 290 814 | 11/1988 |
| EP | 0 680 107 | 11/1995 |
| EP | 0 710 994 | 5/1996 |
| JP | 88-210143 | 8/1988 |
| WO | 93/01622 | 1/1993 |

OTHER PUBLICATIONS

Abstract of Japan, JP 9115739A, Yuasa Corp. KK (YUAS).
Abstract of Japan, JP 7290627, Tonen Kagaku KK (TOFU).
Abstract of Japan, JP 9082304, Toshiba Battery Co Ltd (RAYN); Toshiba KK (TOKE).

* cited by examiner

*Primary Examiner*—Carol Chaney
*Assistant Examiner*—Dah-Wei D. Yuan
(74) *Attorney, Agent, or Firm*—Lerner, David, Littenberg, Krumholz & Mentlik, LLP

(57) ABSTRACT

Non-woven fabrics are disclosed comprising substantially unbonded fibers and vinyl monomers which are capable of reacting with an acid or a base to form a salt directly or indirectly by a reaction involving exposure to ultraviolet radiation while impregnated with a solution of the vinyl monomer copolymerized to the surface of the fibers. Laminates of these non-woven fabrics as well as electrochemical devices employing them as a separator, and methods of treating such non-woven fabrics are also disclosed.

9 Claims, No Drawings

NON-WOVEN FABRIC TREATMENT

FIELD OF THE INVENTION

This invention relates to a method of treating a non-woven fabric and to a treated non-woven fabric. The fabric can be used as a separator in an electrochemical device.

BACKGROUND OF THE INVENTION

Non-woven fabrics are used for separation applications relying on the porosity that is available from the non-woven structure. A balance has to be established between appropriate porosity and the physical properties of the fabric, in particular in terms of tensile strength of the fabric. The material and structure of the fabric have to be selected according to the requirements for the fabric when in use. An example of an application for a non-woven fabric is as an electrode separator in an electrochemical device such as an electrochemical cell. Examples of such cells include nickel-cadmium and nickel-metal hydride cells. The separator should be inert towards materials with which it comes into contact in the cell including in particular the alkaline electrolyte and the electrode materials. It should also have physical characteristics which enable it to withstand the treatment encountered during assembly of the device and during use. For example, it should be able to withstand the stresses encountered during spiral winding of the cell components. It should also be capable of resisting the growth of dendrites between the electrodes during recharging. Fabrics formed from polypropylene fibres have appropriate properties for use as separators in many electrochemical devices.

Non-woven fabrics can be made by processes which include (a) melt blowing, (b) spinning, and (c) wet or dry laying. The fibres of fabrics made by spinning and wet or dry laying require bonding to one another for the fabric to have integrity, so that it has the mechanical properties required for satisfactory performance. In the case of fabrics made by spinning, the fibres are bonded to one another by the application of heat and pressure so that the structure of the fabric is stable. In the case of fabrics made by wet or dry laying from polypropylene fibres, polyethylene is incorporated into the fabric, either as fibres consisting just of polyethylene or as bicomponent fibres consisting of a polypropylene core and a polyethylene sheath. The polyethylene in the fabric can provide the necessary bonds as a result of heating the fabric to a temperature that is greater than the softening point of the polyethylene.

A fabric that is made from spun fibres which are then bonded together (a "spun bonded" fabric) can have the disadvantage that the bonds reduce the effective surface area of the fabric that is available to ion transfer by effectively blocking the pores of the fabric. The uneven current distribution that results from this uneven pore distribution can give rise to dendrite formation during recharging of a secondary cell, ultimately leading to a short circuit in the cell. There is therefore a compromise to be reached with such fabrics between mechanical properties that are enhanced by bonds between the fibres and electrochemical performance which is diminished by the bonds.

A fabric that is formed by wet or dry laying of fibres has satisfactory mechanical properties. However, especially when bicomponent fibres are used, the fibre size can tend to be undesirably large, often greater than 15 $\mu$m.

An example of a process for treating a polyolefin non-woven fabric to render it hydrophilic is disclosed in WO-A-93/01622. The process involves impregnating a non-woven fabric formed from polyolefin fibres with an aqueous solution of a vinyl monomer (such as acrylic acid), and exposing the impregnated fabric to ultraviolet radiation while restricting exposure of the fabric to oxygen. The process results in copolymerisation of the vinyl monomer and the polyolefin of the fibres. Surprisingly, it also results in crosslinking of the material of the fabric. This can therefore result in an improvement in the tensile properties of the fibres. The resulting treated fabric can also be found to exhibit good resistance to degradation on exposure to alkaline electrolyte materials.

The technique disclosed in WO-A-93/01622 has been found to have beneficial effects on the physical properties of the polymeric material of the fibres of a non-woven fabric. However, acceptable physical properties of the separator have hitherto been derived from bonds between the fibres of the separator, through the application of heat and pressure or by incorporation of additional bonding materials or both.

SUMMARY OF THE INVENTION

In accordance with the present invention, a non-woven fabric is provided comprising substantially unbonded fibers and a vinyl monomer which is capable of reacting with an acid or a base to form a salt directly or indirectly by a reaction which involves exposure to ultraviolet radiation while impregnated with a solution of the vinyl monomer copolymerized to the surface of the fibers. In a preferred embodiment, the fabric has a tensile strength measured in the machine.direction which is at least about 1.5 times the tensile strength of the fabric prior to the copolymerization reaction.

In accordance with one embodiment of the fabric of the present invention, the fabric is produced by a process such as wet laying, dry laying or fiber spinning.

In accordance with one embodiment of the fabric of the present invention, the mean thickness of the fabric is less than about 400 $\mu$m. In another embodiment, the mean thickness of the fabric is at least about 80 $\mu$m.

In accordance with another embodiment of the fabric of the present invention, the vinyl monomer comprises an ethylenically unsaturated carboxylic acid or an ester thereof.

In accordance with yet another embodiment of the fabric of the present invention, at least about 40% by weight of the fibers comprise polypropylene.

In accordance with another embodiment of the fabric of the present invention, the mean thickness of the fibers is less than about 30 $\mu$m.

In accordance with the present invention, a laminate of the above-described fabric is provided with at least one further non-woven fabric comprising fibers of a hydrophobic polymeric material copolymerized with a vinyl monomer which is capable of reacting with an acid or a base to form a salt directly or indirectly by a reaction.

In accordance with the present invention, an electrochemical device has also been provided comprising an anode, a cathode, a quantity of an electrolyte, and an electrode separator formed from a fabric as set forth above or from a laminate as set forth above.

In accordance with the present invention, a method has also been provided of treating a non-woven fabric comprising substantially unbonded fibers which comprises impregnating the non-woven fabric with a solution of a vinyl monomer capable of reacting with an acid or a base to form a salt directly or indirectly, a solvent comprising a solvent which does not evaporate significantly when exposed to ultraviolet radiation, and exposing the impregnated fabric to ultraviolet radiation while the exposure of the fabric to oxygen is restricted, thereby causing the monomer and the fibers to copolymerize.

The present invention provides a technique for treating a non-woven fabric involving copolymerisation of a vinyl monomer to the surface of the fibres by an ultraviolet radiation initiated reaction which, applied to a fabric formed from substantially unbonded fibres, has been found to improve the physical properties of the fabric as well as render it hydrophilic.

Accordingly, in one aspect, the invention provides a non-woven fabric which is formed from fibres which are substantially unbonded and which has copolymerised to the surface of the fibres a vinyl monomer which is capable of reacting with an acid or a base to form a salt directly or indirectly by a reaction which involves exposure of the fabric to ultraviolet radiation while impregnated with a solution of the vinyl monomer.

In another aspect, the invention provides a method of treating a non-woven fabric which comprises:

(a) impregnating the non-woven fabric with a solution of a vinyl monomer capable of reacting with an acid or a base to form a salt directly or indirectly, the solvent being one which does not evaporate significantly in the subsequent step of exposing the fabric to radiation, and (b) exposing the impregnated fabric to ultraviolet radiation while the exposure of the fabric to oxygen is restricted, to cause the monomer and the material of the fibres to co-polymerise, in which the structure of the fabric prior to the treatment is such that the fibres are substantially unbonded.

DETAILED DESCRIPTION

The technique of the present invention has the advantage that it enables hydrophilic fabrics to be made from non-woven fabrics which, due to their construction, have physical properties prior to the hydrophilic treatment which make them unsuitable for many applications because of the conditions to which such fabrics are exposed, prior to and during use. Such fabrics include those made by techniques such as spinning, and wet or dry laying, without a subsequent bonding step. It provides the advantage of enabling a non-woven fabric to be made with enhanced physical properties, without the disadvantages arising from the large size of bicomponent fibres, and from disruption of the surface of a fabric due to localised heat and pressure bonding. For example in an electrochemical device, the use of a separator formed from a non-woven fabric with fine fibres can minimise the internal resistance of the devise, and can extend the recharging cycle life of the device as a result of good absorption and subsequent retention of electrolyte.

The improvement in physical properties that can be obtained in non-woven fabrics from the technique of the present invention include increases in tensile strength of the fabric, measured in its machine direction. The tensile strength can be increased as a result of the copolymerisation reaction, compared with the tensile strength prior to the reaction, by at least about 50%, preferably at least about 100%, more preferably at least about 150%, for example at least about 200%. Importantly, these increases in tensile strength can be obtained at levels of the copolymerisation reaction which provide acceptable hydrophilic properties but without such high levels of graft polymerisation that the fabric is caused to swell excessively. Accordingly, the ratio of the tensile strength of the fabric measured in the machine direction after the copolymerisation reaction to that of the fabric prior to the reaction can be at least about 1.5, preferably at least about 2.0, especially at least about 3.0.

Surprisingly, significant increases in tensile strength can be achieved by the technique of the present invention in non-woven fabrics in which the fibres are substantially unbonded, whereas copolymerisation of vinyl monomer reaction with the fibres of a non-woven fabric made by techniques such as spinning or wet or dry laying, with subsequent bonding, can only give rise to small increases in tensile strength. For example, for equivalent extents of the copolymerisation reaction, increases in tensile strength of as much as 300% can be obtained in fabrics of unbonded fibres (for example a dry laid fabric), but only of about 40% in fabrics of bonded fibres (for example a spun bonded fabric).

Examples of fabrics in which the fibres are substantially unbonded are fabrics formed from spun fibres and fabrics formed from laying fibres, either wet or dry, without a subsequent step of bond formation by the application of heat and pressure. There might be weak forces between the fibres of such fabrics. For example, weak forces can result from a step of calendering a fabric under moderate heat and pressure, which can lead to localised deformation of the fibre material, especially where fibres come into contact with one another. However, the forces will be capable of being overcome when the fabric is placed under tension. It will be possible to discern a boundary between the fibres of the fabric. There will not be any intimate mixing of the materials of the fibres as results from the formation of a weld. Calendering the fabric after the graft polymerisation reaction has been found to give rise to enhanced electrolyte absorption. A fabric that has been calendered after the graft reaction can have an improved ability to absorb impurities, especially ammonia, which might be present in the electrolyte system. Moreover, fibres of the fabric are less likely to be damaged physically as a result of the calendering step when it is carried out after the graft polymerisation reaction.

The fibres of the fabric will be formed from a polymeric material which is inherently hydrophobic and which is capable of undergoing the polymerisation reaction with the vinyl monomer on its surface. The reaction can render the fabric wettable to aqueous media. The fibres can include polymers such as for example polyamides, polyesters and naturally occurring materials such as cellulose based materials. Preferred polymeric materials are polyolefins such as polyethylenes and polypropylenes. Preferably, the material of the surface of at least some of the fibres, for example at least about 40% by weight, preferably at least about 60%, more preferably at least about 80%, comprises polypropylene. Preferably, at least 40% by weight of the material of the fibres of the fabric is polypropylene, more preferably at least about 60%, especially at least about 80%.

Preferably, the material of at least some of the fibres from which the first or second fabric (or each of the fabrics) is formed, for example at least about 40% by weight, preferably at least about 60%, more preferably at least about 80%, is substantially homogeneous throughout the thickness of the fibres. It can be preferred for many applications for the material of substantially all of the fibres to be substantially homogeneous throughout their thickness, so that those fibres are formed only from polypropylene or another suitable material (with appropriate additives where necessary).

The fabric can be made from fibres comprising more than one material, for example more than one polymer or a polymer having different physical properties in different regions of the fibres or the fabric. For example, the fabric may be made from at least some fibres formed from two polymers such as bicomponent fibres with the components arranged coaxially or side-by-side.

It is particularly preferred that the fabric is formed from fibres which comprise polypropylene alone. This has the advantage that the physical properties of the fabric are those of a non-woven fabric formed from polypropylene fibres which are generally preferred compared with other polyolefin fibres. Compared with bicomponent fibres, the use just of polypropylene fibres his the advantage that the fibres can be made thin without increasing the cost undesirably.

The ion exchange capacity of the polymeric sheet is measured in meq.g$^{-1}$ according to the test routine referred to below, to provide a measure of the extent of the graft copolymerisation reaction between the material of the fibres and the vinyl monomer. Preferably, the ion exchange capacity is at least about 0.15, more preferably at least about 0.4, especially at least about 0.6. Preferably, the ion exchange capacity is not more than about 2.0, more preferably not more than about 1.6, especially not more than about 1.4, for example not more than about 1.2. It has been found that useful increases in the physical properties of polypropylene fibres of a non-woven fabric and of the fabric itself formed from unbonded fibres can be obtained at low graft levels corresponding to these values of the ion exchange capacity.

The gel fraction of the material of the fabric is measured according to ASTM D2765-84, providing a measure of the extent of crosslinking of the fabric. Preferably, the gel fraction is at least about 10%, more preferably at least about 20%, especially at least about 30%.

Preferably, the mean thickness of the fibres (which might be measured as a mean diameter, especially when the fibres have a circular cross-section) from which the non-woven fabric is formed is less than about 30 μm, more preferably less than about 10 μm. The thickness of the fibres will often be more than about 5 μm.

Preferably, the effective mean size of pores that are defined by the fibres of the fabric, as measured using a Coulter porometer, is less than about 60 μm, more preferably less than about 45 μm, for example less than about 30 μm. Such small pore sizes can be attained using small diameter fibres, such as those referred to above. The use of a fabric with a small pore size as a separator in an electrochemical device has the advantage that the ability of the separator to prevent penetration of electrode materials, for example as dendrites, is enhanced. A small pore size also enhances the ability of the fabric to absorb and to retain electrolyte once the fibres have been treated to render them hydrophilic. A high electrolyte absorption has the advantage of reducing the internal resistance of a device in which the fabric is incorporated as an electrode separator, and of extending the cycle life of the device.

Preferably, the thickness of the fabric, measured using test method DIN 53105 which involves lowering a 2.0 kg weight onto a sample of the sheet of area 2.0 cm$^2$ at a speed of 2.0 mm.s$^{-1}$, is greater than about 80 μm, more preferably greater than about 100 μm; preferably, the thickness is less than about 400 μm, more preferably less than about 250 μm. The method by which the sheet is made may include a step of calendering the fabric to reduce its thickness to a value within the range referred to above, the reduction being by at least about 5%, preferably at least about 15%, more preferably at least about 25%, and less than about 60%, preferably less than about 45%, more preferably less than about 40%. Calendering can have the advantage of reducing the effective size of the pores in the fabric, improving its barrier properties. The calendering step may take place before or after the material of the fabric is reacted with the graft-polymerisationr solution. Calendering the fabric before the graft-polymerisation reaction has been found to give rise to increased rates of the reaction.

The vinyl monomer which is graft-polymerised with the polypropylene of the fibre surface can be capable of reacting with an acid or a base directly to form a salt, or indirectly to form a salt after appropriate work up, perhaps involving for example hydrolysis or sulphonation. Preferred vinyl monomers include ethylenically unsaturated carboxylic acids and esters thereof such as acrylic acid, methacrylic acid, methyl acrylate, and methylmethacrylate. Other vinyl monomers which might be used include acrylamide, vinylpyridine, vinylpyrrolidone and styrene-sulphonic acid.

In another aspect, the invention provides a laminate of a fabric as discussed above and at least one further non-woven fabric formed from fibres of a hydrophobic polymeric material which has undergone a copolymerisation reaction with a vinyl monomer which is capable of reacting with an acid or a base to form a salt directly or indirectly by a reaction. The fabrics of the laminate can be bonded to one another. However, they can be unbonded for some applications. Features of laminates of non-woven fabrics which can be incorporated into the laminate of the present invention are disclosed in the patent application filed with the present application, claiming priority from UK patent application no. 9712692.4 and entitled NON-WOVEN FABRIC LAMINATE (bearing the agents' reference P10600). Subject matter disclosed in the specification of that application is incorporated in the present specification by this reference.

In a further aspect, the invention provides an electrochemical device, comprising an anode, a cathode, a quantity of an electrolyte, and an electrode separator formed from a fabric of the type discussed above. Preferably, the cathode in the device comprises nickel (II) hydroxide. An example of material which can form the anode in such a device includes cadmium. Alternatively, the anode may be a metal hydride electrode. Other types of electrochemical device in which the separator of the invention finds application include secondary cells such as lead-acid cells.

The use of a solvent which does not evaporate to a significant degree in the irradiation step of the method has been found to confer the advantages of providing greater uniformity of properties of the resulting sheet, throughout the thickness of the sheet. Thus there is greater uniformity in the degree of grafting throughout the thickness of the sheet, leading to improved ion exchange properties through the sheet. It is believed that this might arise at least in part because of the transparency of the sheet which is retained as a result of the retention of the solvent in the pores of the fabric. It has also been found that the degree or adverse effects or both of homopolymerisation of the vinyl monomer can be reduced by selection of an appropriate solvent.

Suitable solvents for use in the method of the invention will generally be transparent to ultraviolet radiation, have no atoms which are abstractable when exposed to radiation, have a high specific heat and a high latent heat of vaporisation, and will not react adversely with the material of the fibres of the separator. Preferred solvents will have a boiling point which is greater than about 50° C., preferably greater than about 70° C. It is also preferred that the boiling point of the solvent be no higher than a temperature at which the film might be damaged during the course of the irradiation step of the method. For example, the boiling point of the solvent might be selected to be less than the temperature at which the material of the fibres melts or softens. Particularly preferred solvents have a latent heat of vaporisation which is greater than about 1000 $J.g^{-1}$, preferably greater than about 1500 $J.g^{-1}$, more preferably greater than about 2000 $J.g^{-1}$, and/or a specific heat capacity which is greater than about 2.0 $J.g^{-1}.K^{-1}$, preferably greater than about 3.0 $J.g^{-1}.K^{-1}$, more preferably greater than about 4.0 $J.g^{-1}.K^{-1}$. A value of specific heat capacity, or of latent heat of vaporisation, within these ranges has the advantage that the solvent in the reaction has an enhanced ability to dissipate heat without evaporating to a significant degree, giving rise to the advantages referred to above. A particularly significant further advantage is that the formation of product from the homopolymerisation reaction of the vinyl monomer is restricted, and any such product which is formed is retained in solution rather than being deposited in the pores within the sheet. This allows the product to be removed easily from the sheet by washing. The control over the formation of the homopolymerisation product can be achieved without use of inhibiting agents, which can cause contamination problems when the sheet is in use in certain applications. Water is a particularly preferred solvent.

The ultraviolet radiation initiated polymerisation reaction can be completed surprisingly quickly, for example by exposing the impregnated fabric to radiation for as little as 15 seconds, even as little as 5 or 10 seconds, and it has been found that the fabric after reaction contains a significant amount of grafted monomer, which can be sufficient for the fabric to be rendered wettable by aqueous solutions such as might be found in certain electrochemical devices.

Techniques by which exposure of the impregnated fabric to oxygen can be restricted include, for example, carrying out the ultraviolet irradiation step in an inert atmosphere, for example in an atmosphere of argon or nitrogen, or sealing the impregnated fabric between sheets of material which are impervious to oxygen, but are transparent to ultraviolet radiation of appropriate wavelength for initiating the copolymerisation reaction.

Preferably, the impregnation solution includes an initiator for the polymerisation reaction. Preferably, the initiator initiates the reaction by abstracting an atomic species from one of the reacting materials, for example by abstracting a hydrogen atom from the polypropylene of the fabric fibres to create a polymeric radical. Following such abstraction, the polymeric radical, in contact with the monomer in solution, can initiate the formation of a grafted branch. When an atom is abstracted from the polypropylene of the fabric fibres, the activated polypropylene molecule can react either with another polypropylene molecule so that the polypropylene of the fabric becomes cross-linked, or with the vinyl monomer in a co-polymerisation reaction. An example of a suitable initiator is benzophenone. The mole ratio of the vinyl monomer to the initiator is preferably at least about 50, more preferably at least about 100, especially at least about 175; the ratio is preferably less than about 1500, more preferably less than about 1000, especially less than about 500, more especially less than about 350; for example the ratio may be about 200.

The impregnation solution may include a component by which homopolymerisation of the vinyl monomer is inhibited. Examples of suitable inhibitors include iron (II) and copper (II) salts which are soluble in the reaction medium, a preferred material for aqueous media being iron (II) sulphate. It has been found, however, that the need for an inhibitor can be avoided by selection of an appropriate solvent for the graft-polymerisation reaction which can restrict the speed and degree of the homopolymerisation reaction, for example as a result of its ability to act as a heat sink. This can be an advantage when it is desired to minimise the amount of contaminants in the sheet.

The impregnation solution may include additional components to optimise reaction Conditions such as surfactants to ensure that the solution fully impregnates the non-woven fabric, an appropriate mixture of solvents to ensure homogeneity of the solution, and so on.

The use of ultraviolet radiation in the method of the invention allows non-woven fabrics suitable for use as electrode separators to be made economically and on a continuous basis. It has been found that sufficient energy can be supplied to an impregnated fabric for the irradiation process to be run continuously, and that the heat which is generated in such a process can be controlled by use of appropriate solvents as heat sink components.

A benefit of the present invention is that physical properties of the treated fabric (in particular, its tensile strength or its ability to be wetted by aqueous solutions or both) can be stable on prolonged exposure to an alkaline solution. A fabric with stable physical properties is particularly appropriate for use as a separator in electro-chemical devices in which the electrolyte comprises an alkaline solution. A test to determine stability on exposure to alkaline solution involves storing a sample of a fabric to a solution containing 30% by weight of potassium hydroxide at 71° C. for 21 days, and then comparing the selected property of the exposed fabric to that of a fabric that has not been exposed to the alkaline solution.

Measurement of Ion Exchange Capacity

A sample of membrane about 0.5 g is converted into the acid ($H^+$) form by immersion in 1.0 M hydrochloric acid at 60° C. for 2 hours. The sample is washed in distilled water until the washing water shows a pH in the range of about 6 to 7. The sample is then dried to constant weight at 70° C.

The dried sample is placed in a 100 ml polyethylene bottle to which is added accurately 10 ml of approximately 0.1 M potassium hydroxide. Additional distilled water can be added to immerse the sample fully. A further 10 ml of potassium hydroxide is added to a second polyethylene bottle, together with the same amount of distilled water as that added to the bottle containing the sample. Both bottles are stored at 60° C. for at least two hours.

After being allowed to cool, the contents of each bottle are transferred to glass conical flasks, and the amount of potassium hydroxide in each is determined by titration with standardised 0.1 M hydrochloric acid, using a phenolphthalein indicator.

The ion exchange capacity, measured in milliequivalents per gram, of the membrane in the dry acid ($H^+$) form is calculated according to the equation:

$$IEC = \frac{t_2 - t_1}{10W}$$

where $t_1$ is the titration value of HCl from bottle with the sample, $t_2$ is the titration value of HCl from bottle without the sample, and W is the weight of the dried membrane in acid ($H^+$) form.

Examples of treatments of non-woven fabrics are set out below.

EXAMPLE 1

A dry laid non-woven fabric with a thickness of 140 μm and a basis weight of 60 $g.m^{-2}$ was manufactured from carded pure polypropylene staple fibres. A web formed from fibres was densified by passage through a set of smooth rollers which were heated to a temperature of 160° C.

The fabric was immersed in a solution formulated as follows (percentages by weight):

| Component | wt. % |
|---|---|
| Acrylic acid | 30.0 |
| Benzophenone | 0.25 |
| Surfactant (Lutensol ON70 ™) | 0.5 |
| Water | 69.25 |

The impregnated fabric was maintained in an atmosphere of nitrogen and passed through an irradiation chamber defined by quartz glass walls. Medium pressure mercury vapour lamps were positioned parallel to one another on opposite sides of the chamber outside the quartz glass walls. The lamps had a power output of 120 W.cm$^{-1}$ and were located 16 cm from the fabric. Each lamp provided a parallel ultraviolet light beam with a width of 10 cm. The total exposure time of the fabric to the radiation was about 6 seconds.

The fabric was then washed in de-ionised water to remove unreacted components and then dried in an air oven at approximately 70° C.

The properties of the treated fabric are set out below, and compared with the corresponding properties of the polypropylene fabric starting material:

|  | Ungrafted | | Grafted | |
|---|---|---|---|---|
| Ion exchange capacity (meq · g$^{-1}$) | 0 | | 0.72 | |
| Gel content (%) (ASTM D2765-84) | 0 | | 56.1 | |
| Machine direction tensile strength (N · m$^{-1}$) (ASTM D 882) | 490 | | 1584 | |
| Machine direction elongation (%) (ASTM D 882) | 7.9 | | 14.3 | |
| Electrolyte wicking rate (time) (30% w/w KOH) (DIN 53924-78) (mm) | 60 s | 600 s | 60 s | 600 s |
|  | 0$^a$ | 0$^a$ | 35 | 92 |
| Electrolyte absorption (%) (AD 447301 U.S. Air Force Manual) | Non-wetting$^a$ | | 215 | |

($^a$after washing in water to remove processing aids)

EXAMPLE 2

The procedure of Example 1 was followed with a dry laid non-woven fabric with a thickness of 171 μm and a basis weight of 60 g.m$^{-2}$.

The properties of the treated fabric are set out below, and compared with the corresponding properties of the polypropylene fabric starting material:

|  | Ungrafted | Grafted |
|---|---|---|
| Ion exchange capacity (meq · g$^{-1}$) | 0 | 0.2 |
| Gel content (%) (ASTM D2765-84) | 0 | 45.4 |
| Machine direction tensile strength (N · m$^{-1}$) (ASTM D 882) | 460 | 1660 |

EXAMPLE 3

A non-woven fabric with a thickness of 140 μm and a basis weight of 45 g.m$^{-2}$ was manufactured from continuously spun pure polypropylene fibres. A web formed from fibres was densified by passage through a set of smooth bowl rollers which were heated to a temperature of 135° C.

The fabric was immersed in the acrylic acid solution and irradiated using the procedure described above in Example 1.

The properties of the treated fabric are set out below, and compared with the corresponding properties of the polypropylene fabric starting material:

|  | Ungrafted | Grafted |
|---|---|---|
| Ion exchange capacity (meq · g$^{-1}$) | 0 | 0.75 |
| Gel content (%) (ASTM D2765-84) | 0 | 78.3 |
| Machine direction tensile strength (N · m$^{-1}$) (ASTM D 882) | 1050 | 3109 |

EXAMPLE 4

The procedure of Example 3 was followed with a dry laid non-woven fabric with a thickness of 177 μm and a basis weight of 45 g.m$^{-2}$.

The properties of the treated fabric are set out below, and compared with the corresponding properties of the polypropylene fabric starting material:

|  | Ungrafted | Grafted |
|---|---|---|
| Ion exchange capacity (meq · g$^{-1}$) | 0 | 0.7 |
| Gel content (%) (ASTM D2765-84) | 0 | 88.4 |
| Machine direction tensile strength (N · m$^{-1}$) (ASTM D 882) | 800 | 2641 |

EXAMPLE 5

The procedure of Example 1 was used to make a dry laid non-woven fabric from a mixture of 50 wt. % pure polypropylene staple fibres and 50 wt. % polyethylene/polypropylene bicomponent staple fibres. The fabric had a thickness of 145 μm and a basis weight of 60 g.m$^{-2}$. It was immersed in an acrylic acid solution and irradiated using the procedure described above in Example 1.

The properties of the treated fabric are set out below, and compared with the corresponding properties of the polypropylene fabric starting material:

|  | Ungrafted | Grafted |
|---|---|---|
| Ion exchange capacity (meq · g$^{-1}$) | 0 | 0.7 |
| Gel content (%) (ASTM D2765-84) | 0 | 56.1 |
| Machine direction tensile strength (N · m$^{-1}$) (ASTM D 882) | 401 | 1115 |

Use in a Battery

An AA size alkaline spirally wound nickel-metal hydride (Misch metal electrode) cell was constructed using a separator of the type described above in Example 5. The cell was repeatedly charged at 350 mA and discharged through a 10 ohm passive load. The cell was found to be capable of delivering 1000 mA.h to a 1.0 V cut-off on discharge.

COMPARATIVE EXAMPLE

The procedure of Example 1 was followed with a spun-bonded non-woven polypropylene fabric used commercially to make battery separators, having a thickness of 200 µm and a basis weight of 50 g.m$^{-1}$.

The properties of the treated fabric are set out below, and compared with the corresponding properties of the polypropylene fabric starting material:

|  | Ungrafted | Grafted |
|---|---|---|
| Ion exchange capacity (meq · g$^{-1}$) | 0 | 0.86 |
| Gel content (%) (ASTM D2765-84) | 0 | 72.2 |
| Machine direction tensile strength (N · m$^{-1}$) (ASTM D 882) | 3767 | 3880 |

What is claimed is:

1. An electrochemical device comprising an anode, a cathode, a quantity of an electrolyte, and an electrode separator formed from a non-woven fabric which is formed from polyolefin fibers which have a mean thickness of less than about 30 µm and in which the fibers have not been subjected to a bonding process which causes intimate mixing of the materials of the fibers so that boundaries between the fibers remain discernible, said non-woven fabric having copolymerized to the surface of said fibers a vinyl monomer which is capable of reacting with an acid or a base to form a salt directly or indirectly by a reaction which involves exposure to ultraviolet radiation while impregnated with a solution of said vinyl monomer.

2. An electrochemical device as claimed in claim 1 wherein said non-woven fabric has a tensile strength measured in the machine direction which is at least about 1.5 times the tensile strength of said non-woven fabric prior to said copolymerization.

3. An electrochemical device as claimed in claim 1 wherein said non-woven fabric has been produced by a process selected from the group consisting of wet laying, dry laying, and fiber spinning.

4. An electrochemical device as claimed in claim 1 wherein said mean thickness of said non-woven fabric is less than about 400 µm.

5. An electrochemical device as claimed in claim 1 wherein said mean thickness of said non-woven fabric is at least about 80 µm.

6. An electrochemical device as claimed in claim 1 wherein said vinyl monomer comprises an ethylenically unsaturated carboxylic acid or an ester thereof.

7. An electrochemical device as claimed in claim 1 wherein at least about 40% by weight of said polyolefin fibers comprise polypropylene.

8. An electrochemical device as claimed in claim 1 wherein said separator includes at least one further non-woven fabric comprising fibers of a hydrophobic polymeric material copolymerized with a vinyl monomer which is capable of reacting with an acid or a base to form a salt directly or indirectly by a reaction therewith.

9. A method of making an electrode separator for an electrochemical device, said method comprising treating a non-woven fabric comprising polyolefin fibers having a mean thickness of less than about 30 µm and have not been subjected to a bonding process, by a process comprising (a) impregnating said non-woven fabric with a solution of a vinyl monomer capable of reacting with an acid or a base to form a salt directly or indirectly, said solvent being one which does not evaporate when exposed to ultraviolet radiation, and (b) exposing said impregnated fabric to ultraviolet radiation while the exposure of said fabric to oxygen is restricted, to cause said monomer and said material of said fibers to copolymerize.

* * * * *

UNITED STATES PATENT AND TRADEMARK OFFICE
CERTIFICATE OF CORRECTION

PATENT NO. : 6,537,695 B2
DATED : March 25, 2003
INVENTOR(S) : Robert Hamilton McLoughlin et al.

It is certified that error appears in the above-identified patent and that said Letters Patent is hereby corrected as shown below:

Column 4,
Line 47, "Preferably" should start a new paragraph.

Column 11,
Line 5, "50 g.m$^{-1}$" should read -- 50 g.m$^{-2}$ --.

Signed and Sealed this

First Day of July, 2003

JAMES E. ROGAN
*Director of the United States Patent and Trademark Office*